(12) United States Patent
Kochsiek

(10) Patent No.: US 10,989,259 B2
(45) Date of Patent: Apr. 27, 2021

(54) BRAKE DISK UNIT

(71) Applicant: Adolf Kochsiek, Leopoldshöhe (DE)

(72) Inventor: Adolf Kochsiek, Leopoldshöhe (DE)

(*) Notice: Subject to any disclaimer, the term of this patent is extended or adjusted under 35 U.S.C. 154(b) by 0 days.

(21) Appl. No.: 16/311,114

(22) PCT Filed: Jun. 28, 2017

(86) PCT No.: PCT/EP2017/065966
§ 371 (c)(1),
(2) Date: Dec. 18, 2018

(87) PCT Pub. No.: WO2018/002120
PCT Pub. Date: Jan. 4, 2018

(65) Prior Publication Data
US 2020/0141459 A1    May 7, 2020

(30) Foreign Application Priority Data
Jun. 28, 2016 (EP) .................... 16176686

(51) Int. Cl.
*F16D 65/12* (2006.01)
*F16D 1/08* (2006.01)
(Continued)

(52) U.S. Cl.
CPC ......... *F16D 65/123* (2013.01); *F16D 1/0852* (2013.01); *F16D 1/104* (2013.01); *F16D 2001/102* (2013.01); *F16D 2065/1356* (2013.01)

(58) Field of Classification Search
CPC ...... F16D 65/123; F16D 1/0852; F16D 1/104; F16D 65/125; F16D 2065/1388;
(Continued)

(56) References Cited

U.S. PATENT DOCUMENTS 4,610,331 A * 9/1986 Rogier ................. B60K 17/046
                                                                180/370
5,158,390 A * 10/1992 Ito ............................ F16D 1/06
                                                                403/282
(Continued)

FOREIGN PATENT DOCUMENTS

DE         3813272 A1    11/1988
DE    102004004456 A1     6/2005
(Continued)

OTHER PUBLICATIONS

Search Report for corresponding PCT application PCT/EP2017/065966 dated Jan. 1, 2019.*

*Primary Examiner* — Pamela Rodriguez
(74) *Attorney, Agent, or Firm* — Harness, Dickey & Pierce, P.L.C.

(57) ABSTRACT

In order to provide a brake disc unit the production and assembly of which is economically viable even with extreme mechanical and thermal load capacity, preferably without the application of intermediate elements, the disclosure proposes a brake disc unit with a friction ring and a friction ring carrier which are connected by a shaft-to-hub connection with an alignment gearing having a multitude of dogs, wherein the cross-section of the dogs provides a contour which, at least partly, runs along an extended trochoid.

16 Claims, 7 Drawing Sheets

(51) Int. Cl.
*F16D 1/104* (2006.01)
*F16D 1/10* (2006.01)
*F16D 65/02* (2006.01)

(58) Field of Classification Search
CPC ......... F16D 2065/13; F16D 2065/1304; F16D 2065/1324; F16D 2065/134; F16D 2065/1356; F16D 2065/1384; F16D 2001/102
USPC .............. 188/18 A, 218 XL, 218 R; 301/6.1; 192/217.3; 403/408.1; 411/84, 87, 88, 411/102; 24/459, 569
See application file for complete search history.

(56) References Cited

U.S. PATENT DOCUMENTS

| | | | |
|---|---|---|---|
| 6,374,956 B1 * | 4/2002 | Naeumann | F16D 55/40 188/18 A |
| 6,702,508 B2 * | 3/2004 | Simons | F16D 1/101 403/359.2 |
| 6,997,292 B2 * | 2/2006 | Burgoon | F16D 65/123 188/18 A |
| 7,077,247 B2 * | 7/2006 | Burgoon | F16D 65/123 188/18 A |
| 8,418,817 B2 * | 4/2013 | Visca | F16D 65/12 188/18 A |
| 9,051,632 B2 * | 6/2015 | Kim | C22C 21/06 |
| 2002/0168222 A1 | 11/2002 | Simons et al. | |
| 2003/0059233 A1 | 3/2003 | Jang et al. | |
| 2004/0035659 A1 * | 2/2004 | Pacchiana | C04B 35/573 188/264 R |
| 2012/0279813 A1 | 11/2012 | Kochsiek | |

FOREIGN PATENT DOCUMENTS

| | | |
|---|---|---|
| DE | 102004056642 A1 | 6/2006 |
| DE | 102009056075 A1 | 6/2011 |
| DE | 102010055379 A1 | 6/2012 |
| DE | 202016102524 U1 | 8/2016 |
| EP | 1225356 A1 | 7/2002 |
| EP | 1229266 A2 | 8/2002 |
| FR | 2406750 A1 | 5/1979 |
| WO | 2012/152 442 A1 | 11/2012 |

* cited by examiner

PRIOR ART

PRIOR ART

BRAKE DISK UNIT

CROSS-REFERENCE TO RELATED APPLICATIONS

This application is a National Stage of International Application No. PCT/EP2017/065966, filed on Jun. 28, 2017. This application claims the priority to European Patent Application No. 16176686.0, filed on Jun. 28, 2016. The entire disclosures of the above applications are incorporated herein by reference.

FIELD

The present disclosure relates to a brake disc unit with a friction ring and a friction ring carrier which are connected by means of a shaft-to-hub connection with an alignment gearing having a multitude of dogs.

BACKGROUND

This section provides background information related to the present disclosure which is not necessarily prior art.

Generic brake disc units, so-called composite brake discs, are known per se and in use. Such systems are produced in an complex and expensive manner. Usually, a complexly produced tooth system between friction ring and friction ring carrier is formed, and a secure torque transmission is ensured by intermediate sheets, pins, and the like. In addition to the complex production procedure, assembly and maintenance are also complex. The production procedures usually comprise milling, planing, reaming, etc., whereas fittings need to be produced in a particularly complex manner.

Alignment gearings are also known in the relevant field. An alignment gearing is a multi-dog connection. The torques are usually transmitted by the tooth flanks. The shaft is toothed externally, the hub is toothed internally.

Such alignment gearings have been known as involute or parallel toothing, or fine serration, depending on the formation and contour of the teeth.

In conventional shaft-to-hub connections, feather key plug-in toothings, round fitting connections or other connections with intermediate elements are very common. The intermediate elements are intended to ensure the contact contour required for torque transmission. Other fitting connections known from the prior art also know dogs with polygonal external contours, among them for instance the so-called H- or P3G-profiles. In particular with greater loads and large components, this leads to considerable disadvantages. The connections have a full-surface form fit. Power transmission takes place at every point of the contour normal, i. e. at right angles to the surface normal. Ideally, in particular with great loads, the force application angle should be positioned tangential to the component centre. This, however, is not the case with the known polygonal shapes. Moreover, polygonal shapes for dogs are difficult and complex in production.

SUMMARY

This section provides a general summary of the disclosure, and is not a comprehensive disclosure of its full scope or all of its features.

Starting from the prior art described above, the present disclosure is based on the object to provide a brake disc unit of the generic type, the production and assembly of which is economical also with extreme mechanical and thermal load capacity, preferably without the application of intermediate elements.

For the technical solution of this object, a shaft-to-hub connection with the features of patent claim 1 is proposed. Other advantages and features result from the sub-claims.

According to the disclosure, the cross section of the dogs has a contour which, at least partly, runs along an extended trochoid.

The cross section of the dogs has a contour, or a course of the contour which therefore, in parts or in places, runs along an extended trochoid.

A shaft-to-hub connection in relation to the present disclosure includes any connection between an internal and an external component for the purpose of torque transmission. Among these are particularly disc-shaped hubs, i. e. brake discs.

What is called a cycloid or a cyclic curve is a path described by a point of a circle when rolling along a circle on a guiding curve. The guiding curve may for instance be a straight line or another circle. In this manner, for instance hypocycloids or epicycloids are generated, as well as hypotrochoids or epitrochoids. The typical hypocycloid or hypotrochoid is generated by a point P of a circle with a radius R which, without sliding, rolls along the inside of another circle. The typical epicycloid or epitrochoid is generated by a point P of a circle P which, without sliding, rolls along the outside of another circle. The distance a of the point P from the centre of the radius R is important. If the distance a is unequal to the radius R, this is referred to as trochoids, otherwise as a usual cycloid. If a is smaller than R, this is referred to as shortened trochoids. If a is larger than R, this is referred to as extended trochoids.

Extended trochoids are characterised by their discontinuous shape, i. e. the curves intersect each other during the curve progression. While the prior art describes closed cycloids as far as the type of connecting contour is concerned, the disclosure relates to partial sections or sections of the respective extended trochoids which form a connector cross-section between the shaft and the hub. By using extended trochoids, the force application for torque transmissions is significantly improved in comparison to other types of cycloids. In particular, the shape of the dogs can be designed more steeply. In this manner, particularly stable and efficient connections can be realised. The use of corresponding production processes enables not only an economical, but also a highly precise production, which is the reason why the use of extended trochoids is considered in the first place. The complex processing task would rather make the expert avoid such shapes. This applies to narrow curve shapes, diameter leaps, and the like.

According to an advantageous proposal, the connection is formed axially compressed, or at least free from backlash.

Moreover, it is indicated as a special advantage that the tooth system is produced by cam turning. This applies at least to one of the parts shaft or hub, preferably, however, also to both. This results in a special economic viability also in mass production. Another advantage of the present disclosure is that different materials may be combined. The type of the dog contour results in an optimal torque transmission, without the forces acting on the individual dogs being too strong.

According to another advantageous proposal of the disclosure, the dog may comprise an undercut. Also other areas which are isolated are within the scope of the disclosure. Isolated areas in the shape are areas which are not in contact with shaft and hub.

The disclosure makes it possible to produce corresponding shaft-to-hub connections exclusively by turning processes. The contour is generated during production by means of high-precision turning processes with greatest possible pitch and curve shape accuracy. Pitch errors are practically not measurable.

All dogs may be produced according to the same processing procedure. The shape of all dogs is identical, so that measuring is reduced to one dog. Due to the mathematically unambiguously defined contour, the disclosure is suitable for large batches and can be verified by means of a simplified metrology.

The force transmission vectors rather point in peripheral direction, resulting in an optimised force application for transmission of torques.

The disclosure permits great degrees of freedom with the design and production of shaft-to-hub connections. The number of dogs, the radius of the tool trajectory, and the depth of penetration into the workpiece are production parameters enabling the production of suitable shapes.

The connection can be adjusted and optimised for the respective individual case. In addition to the number of the dogs, their width and height, the size of the interspaces between the dogs, the internal and external functional diameter, the contact areas between the dogs of the shaft and hub of the connection, and the undercut may be varied.

In practice, certain production parameters have proven to be suitable. So for the number of dogs, a range between 7 and 70 dogs was established, while 15 to 40 can be considered as typical. The width of the dogs is preferably >8 mm, particularly preferably >12 mm. The height of the dogs turned out to be preferably >5 mm, particularly preferably >8 mm. The interspace between the dogs is preferably >3 mm, particularly preferably >5 mm. These data also show that the relation between dog and interspace in dependence on the installation space and performance requirement needs not necessarily be 1:1. For instance, 2:1, 2.5:1, but also reversely, 1:2, 1:2.5 and any intermediate relations may be suitable.

An undercut, if any, may preferably measure up to several millimetres.

In a particularly preferable manner, all of the dogs have the same shape.

It has been proven to be advantageous to select an internal functional diameter of at least 100 mm, preferably 140 mm to 220 mm, and an external functional diameter of up to maximally 400 mm, while 150 mm to 300 mm have proven to be of advantage.

The manufacture of the contour by means of turning processes, in particular cam turning processes, results in a high production precision with the highest possible pitch and curve shape accuracy. Pitch errors, if any, are are not measurable. In this manner, a highly uniform contact pattern behaviour is obtained. That means that industrially reproducible connections can be produced in which the force transmission areas are optimal. While in the prior corresponding shaft-to-hub connections, a comparably good contact pattern behaviour will develop only after a prolonged run-in period, this is provided basically immediately with the present disclosure, a fact which principally increases the performance.

The disclosure enables the manufacture of oversize connections (compression connections), so that there are no contact losses with different expansions of shaft and hub. The undercut, where the surface normals preferably face outwards, ensures that the connection cannot lift off. In the case of application of an undercut with sliding fit connections, the undercut ensures that the maximum backlash in the connection is limited with different expansions of shaft and hub.

In order to facilitate joining a shaft with a hub, stepped internal and external contours may be used both in the shaft and in the hub. For this purpose, at least two steps in the shaft and in the hub are dimensioned such that in the first axial area of the connection, a distinct backlash is provided, which facilitates the joining process significantly. Before the components contact each other in the last step, the connection has already centred itself. The two components can be joined with high oversize without impairing the radial or axial run-out quality. In final assembled condition, the entire connection with the oversize defined by the design will be load-bearing, i. e. the entire axial length of the connection is utilised. With this option, in particular with highly loaded connections, the installation space for the connection can be optimised, in particular if a great oversize is required for the functionality of the connection. With the help of the stepped design, heating or deep-freezing can be dispensed with during assembly, which is a considerable advantage.

A brake disc unit according to the disclosure comprises a great number of advantages. The friction ring and the friction ring carrier may consist of different materials. Possible are grey cast iron in combination with aluminium or sheet steel, ceramics, etc. Transmission sections may be formed which constitute elements that transmit self-contained, independent torques.

In an advantageous manner, an oversize between the two components may be formed such that even with a maximum expectable temperature difference between friction ring and friction ring carrier, zero backlash is still guaranteed.

The connection is axially not moveable, nevertheless, according to an advantageous proposal, a locking mechanism against axial pulling-out may be provided. In order to define an axial position in such a case, a planar support may be provided according to an advantageous proposal of the disclosure.

A planar support may be manufactured with the same set-up together with non-round processing.

Recesses and dogs may be pre-shaped in the blank and can be finished by non-round processing. In an advantageous manner, the functional diameter ranges are selected in dependence on the forces to be expected. The same applies to the dimensions width of the dogs, interspace, height of the dogs, and the like.

According to another advantageous proposal of the disclosure, the friction ring carrier may for instance be manufactured in a forming manner in the shape of a pot, so that it needs no further machining in the connection area.

The axial contact ratio between the friction ring and the friction ring carrier results in an axial installation space for the shaft-to-hub connection. According to another advantageous proposal of the disclosure, the shaft-to-hub connection is axially shorter than the installation space, advantageously less than 50%.

The disclosure proposes a novel brake disc unit. This unit can do without any intermediate elements and has an extremely high mechanical and thermal load capacity.

The backlash-free connection which may be formed as a transition fitting, a compressed connection, or even only with very little oversize, leads to a very high thermal load capacity. Nevertheless, due to the disclosure, the brake disc unit can be manufactured with little economic effort, and due to the novel manufacturing procedure, in a very short production time.

DRAWINGS

The drawings described herein are for illustrative purposes only of selected embodiments and not all possible implementations, and are not intended to limit the scope of the present disclosure.

Other advantages and features of the disclosure can be gathered from the following description on the basis of the figures. In these figures.

In the figures, identical elements are identified by the same reference numerals.

DETAILED DESCRIPTION

Example embodiments will now be described more fully with reference to the accompanying drawing.

Figure 1:
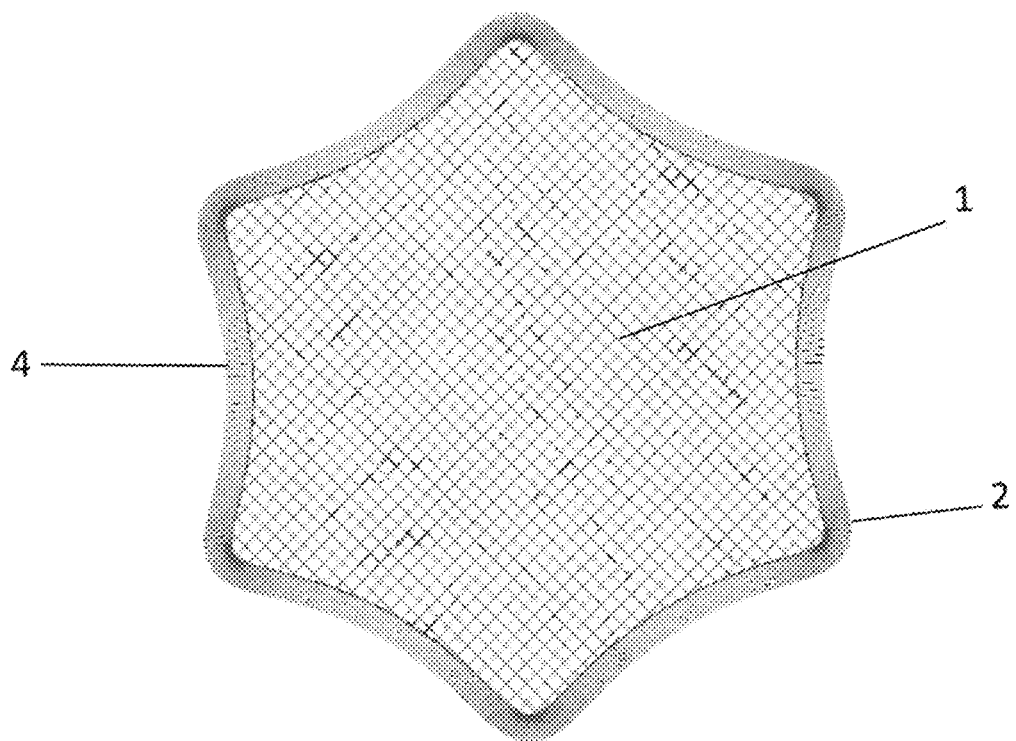
FIG. 1 shows a top view of a polygonal profile of a shaft according to the state of the art.
Figure 2:
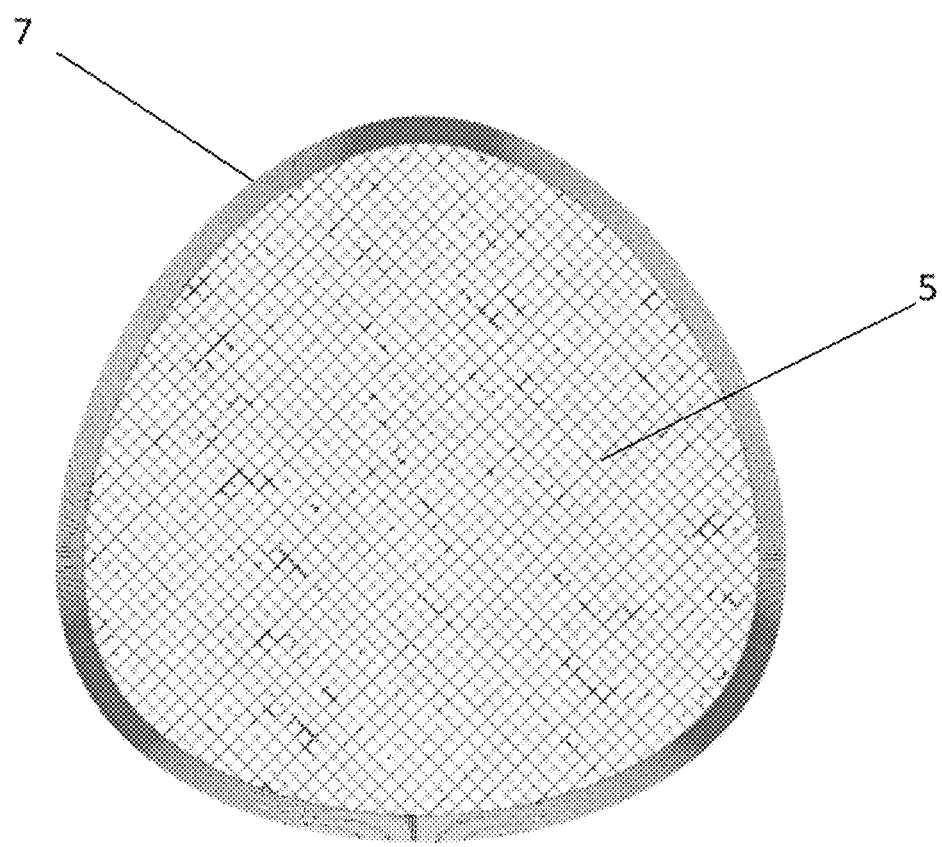
FIG. 2 shows a top view of a polygonal profile of a shaft according to the state of the art.

According to FIGS. 1 and 2, there are, in addition to the standard tooth systems such as involute toothing, parallel toothing, or fine serration which are known per se, also so-called polygonal tooth systems. Polygonal contours as the ones shown have been known from the prior art. FIG. 1 shows a so-called H6 profile 1 by way of example, in which a contour with six corners 2 is formed. This cross section for torque transmission has the surface normal 4.

According to FIG. 2, a so-called P3G profile is shown where the surface normal 7 is formed.

In FIGS. 1 and 2, the respective normals are shown surrounding the entire perimeter. In particular, the course of the normal which is partly extremely unfavourable for force transmission or momentum transmission can be seen here.

Figure 3:
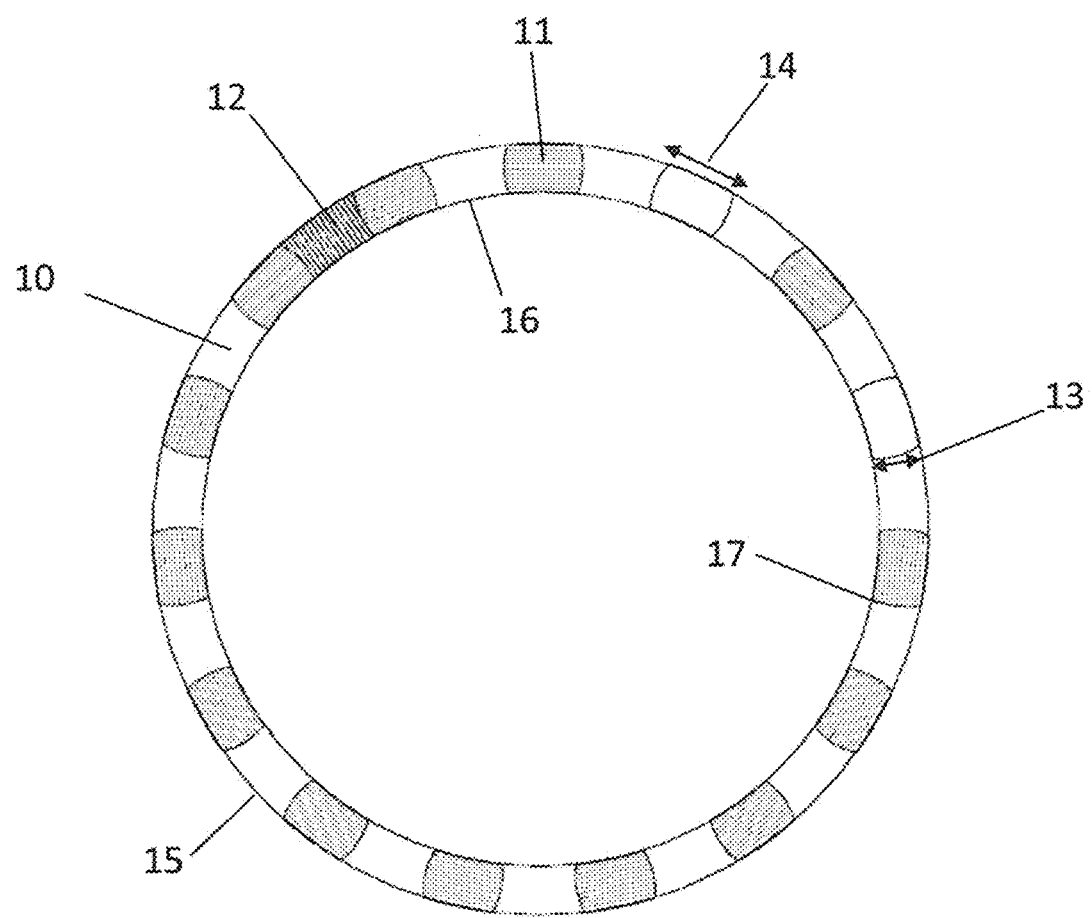
FIG. 3 shows a sectional view (schematised) of an exemplary embodiment of a shaft-hub-profile according to the disclosure.
Figure 4:
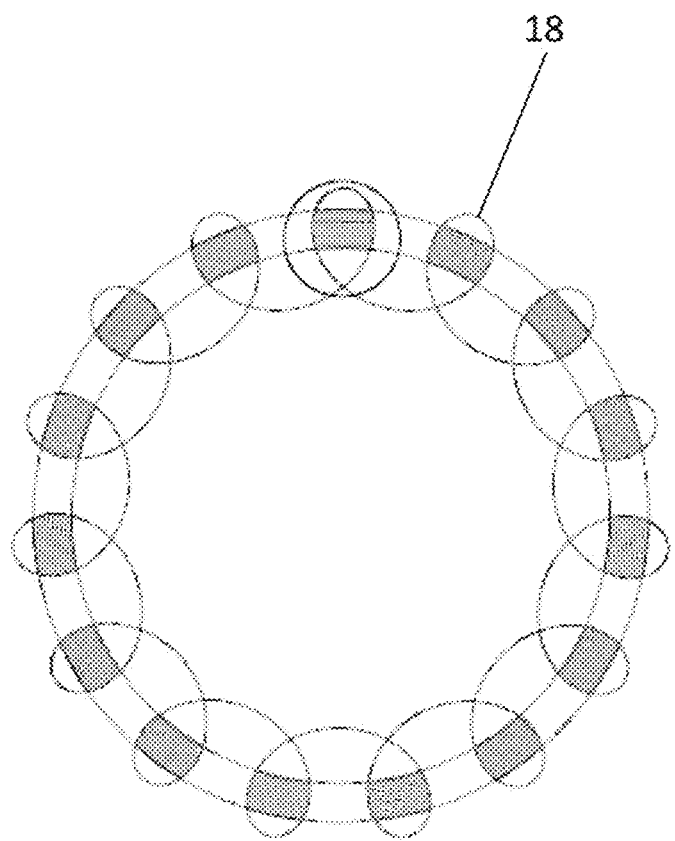
FIG. 4 shows an illustration according to FIG. 3 with representation of the tool trajectory.

The FIGS. 3 and 4 are an exemplary embodiment of a gear tooth profile. The profile 10 comprises dogs 11 with a dog height 13 and interspaces 12, which engages with the corresponding counter-profile. The dogs have dog width 14. They are positioned between the internal functional diameter 16 and the external functional diameter 15. In the exemplary embodiment shown, the dogs have an undercut 17, which is a taper in the area of the root. The tool trajectory 18 is shown in FIG. 4.

Figure 5:
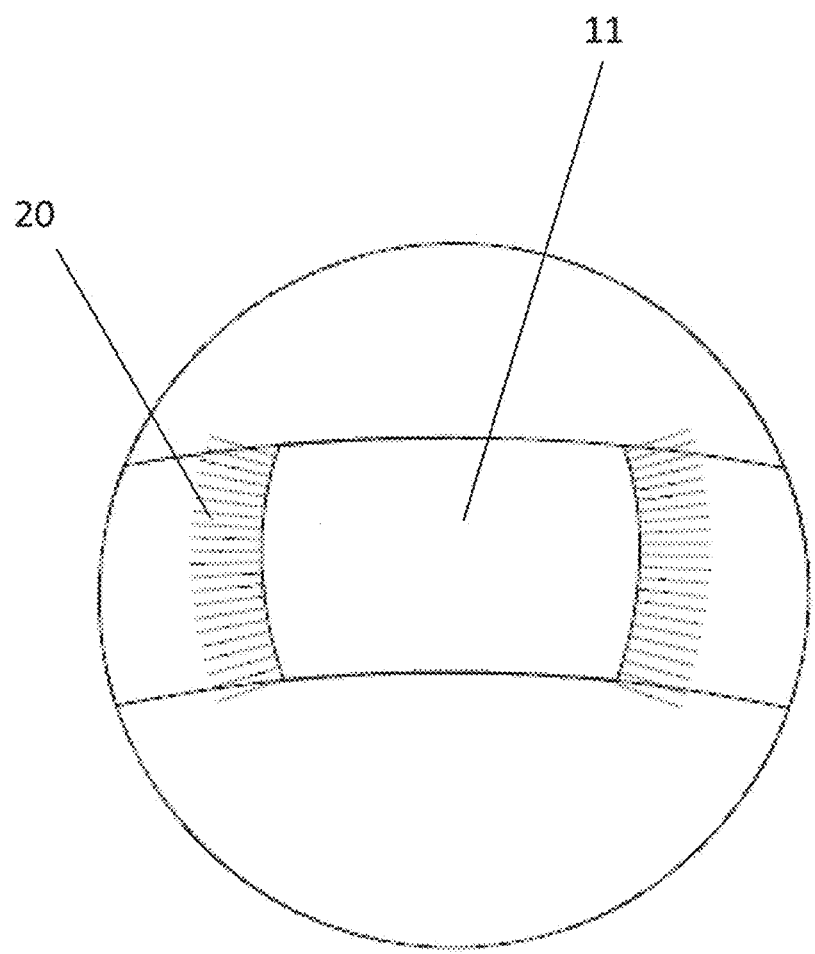
FIG. 5 shows an enlarged illustration of the normal in an exemplary embodiment for a shaft-hub-profile according to the disclosure.

FIG. 5 shows an enlarged illustration of a dog 11 of a shaft-to-hub connection according to FIG. 3. In the shown enlarged illustration, the dog 11 is supplemented by the representation of the normal 20, illustrated by corresponding rays on the dog surface. It turns out that here, a particularly favourable course of the normal is provided, resulting in a special suitability for transmission of forces and torques.

Figure 6:
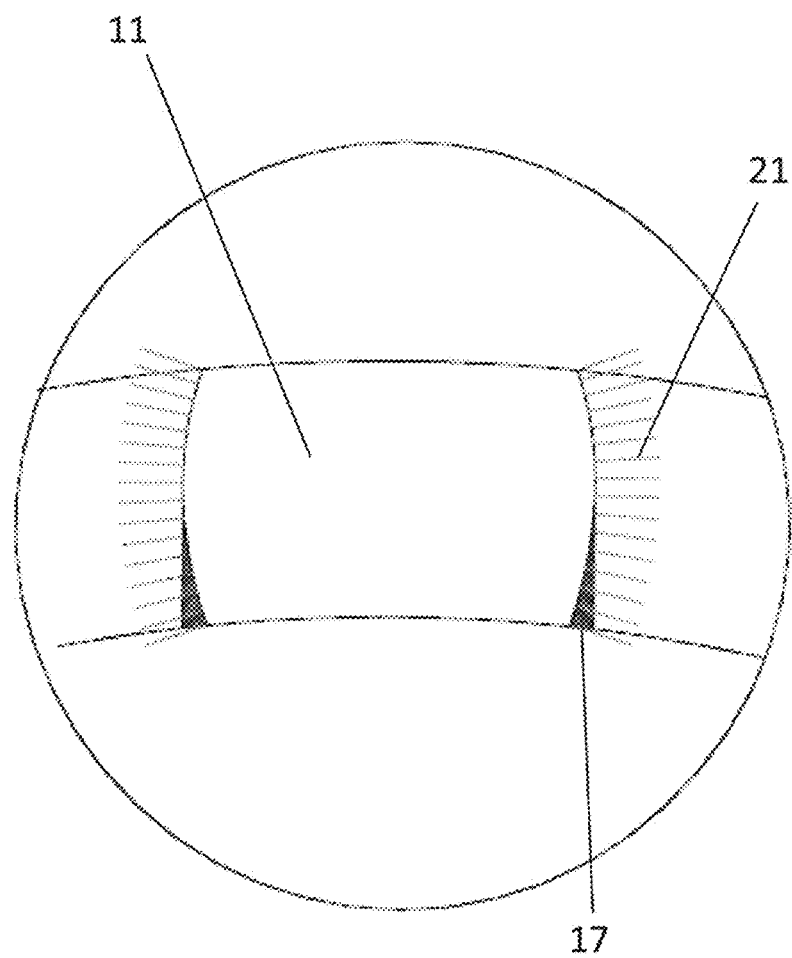
FIG. 6 shows an illustration according to FIG. 5 of an exemplary embodiment with an undercut.

The corresponding illustration shown in FIG. 6 shows a dog 11 and the radial normal 21. In this illustration, the undercut 17 is particularly marked. It results from a deviation from an at least straight or tangential bedding-down of the dog. The undercut contour provides the correspondingly described advantages.

Figure 7A:
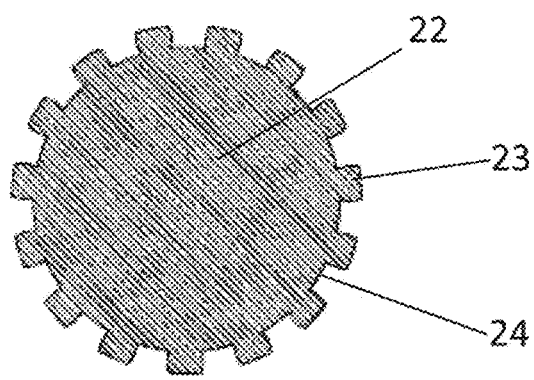
FIG. 7a shows a sectional view of a shaft according to the disclosure.
Figure 7B:
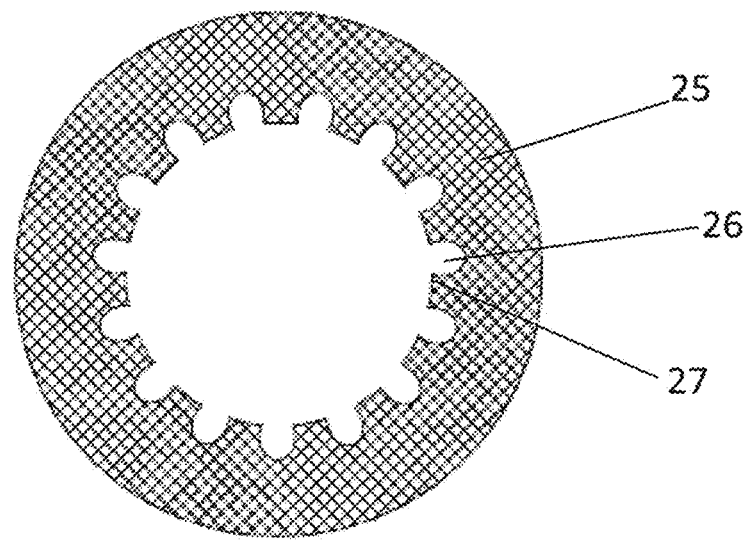
FIG. 7b shows a sectional view of a hub according to the disclosure.
Figure 7C:
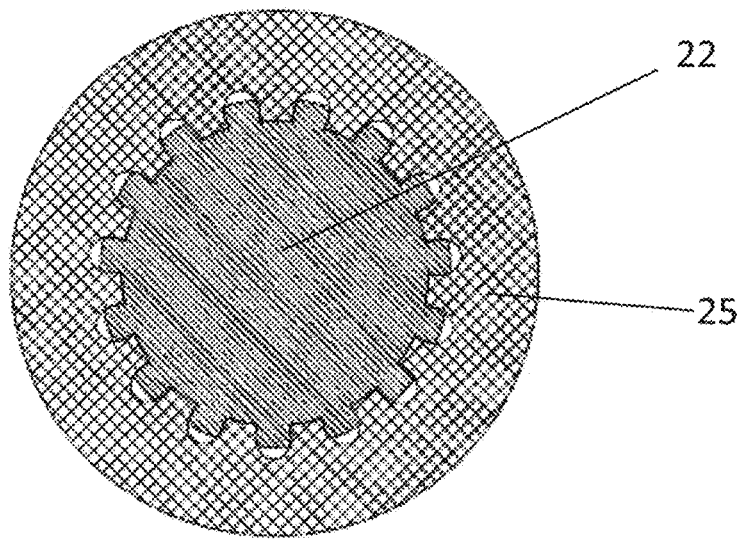
FIG. 7c shows an illustration of the assembly.

An exemplary embodiment of a brake disc unit according to the disclosure is shown in the FIGS. 7a to 7c. A shaft 22 is provided with dogs 23 with interspaces 24 remaining between them. The dogs 23 comprise an undercut in the exemplary embodiment shown.

The hub 25 shown in FIG. 7b has corresponding recesses 26 and interspaces or dogs 27.

Joined together, this results in the illustration according to 7c, which shows that the transmission contacts along the normal are optimised.

The illustrated exemplary embodiment shows for instance that hub 25 may be configured as a brake disc with respect to shaft 22 configured as a central hub body or pot.

The described exemplary embodiments only serve a better understanding and are not restrictive.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A brake disc unit with a friction ring and a friction ring carrier which are connected by means of a shaft-to-hub connection with an alignment gearing having a multitude of dogs,
   wherein the cross section of the dogs has a contour which, at least partly, runs along an extended trochoid.

2. The brake disc unit according to claim 1, wherein the extended trochoid is an extended hypotrochoid.

3. The brake disc unit according to claim 1, wherein the extended trochoid is an extended epitrochoid.

4. The brake disc unit according to claim 1, wherein there are also dogs with different contours.

5. The brake disc unit according to claim 4, wherein the dogs with different contours belong to involute or parallel toothings, and/or fine serrations.

6. The brake disc unit according to claim 1, wherein non-contacting areas are formed in the contour of the dogs.

7. The brake disc unit according to claim 1, wherein the shaft and the hub are compressed.

8. The brake disc unit according to claim 7, wherein a measure for compression is selected in dependence on the maximum temperature difference to be expected between the shaft and the hub.

9. The brake disc unit according to claim 1, wherein the contour is manufactured by cam turning.

10. The brake disc unit according to claim 1, wherein dogs comprise an undercut.

11. The brake disc unit according to claim 1, wherein the friction ring and the friction ring carrier are made of different materials.

12. The brake disc unit according to claim 1, wherein the dogs are arranged in sections.

13. The brake disc unit according to claim 12, wherein each individual section constitutes an independent torque-transmitting unit.

14. The brake disc unit according to claim 1, wherein the alignment gearing comprises areas stepped in an axial direction.

15. The brake disc unit according to claim 1, wherein a locking device against axial displacement is provided.

16. The brake disc unit according to claim 1, wherein the alignment gearing is formed only over part of an axial contact ratio of the shaft and the hub.

* * * * *